(12) United States Patent
Terry et al.

(10) Patent No.: US 8,792,366 B2
(45) Date of Patent: Jul. 29, 2014

(54) NETWORK PACKET LATENCY MEASUREMENT

(75) Inventors: John Michael Terry, San Jose, CA (US); Wing Cheung, Fremont, CA (US); Surya Prakash Varanasi, Dublin, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 284 days.

(21) Appl. No.: 12/916,060

(22) Filed: Oct. 29, 2010

(65) Prior Publication Data

US 2012/0106365 A1 May 3, 2012

(51) Int. Cl.
*H04L 12/26* (2006.01)

(52) U.S. Cl.
USPC .......................................... 370/252; 370/392

(58) Field of Classification Search
USPC ................................................ 370/252, 392
See application file for complete search history.

(56) References Cited

U.S. PATENT DOCUMENTS

| | | | |
|---|---|---|---|
| 5,315,580 A | 5/1994 | Phaal | |
| 5,477,531 A | 12/1995 | McKee et al. | |
| 5,884,244 A | 3/1999 | Phaal | |
| 6,643,612 B1 * | 11/2003 | Lahat et al. | 702/186 |
| 6,894,972 B1 | 5/2005 | Phaal | |
| 7,164,657 B2 | 1/2007 | Phaal | |
| 7,245,587 B2 | 7/2007 | Phaal | |
| 7,587,485 B1 | 9/2009 | Chitnis et al. | |
| 7,639,616 B1 * | 12/2009 | Manula et al. | 370/235 |
| 8,228,923 B1 * | 7/2012 | Jain et al. | 370/395.62 |
| 2010/0142398 A1 * | 6/2010 | Arad et al. | 370/252 |

OTHER PUBLICATIONS

Phaal et al., "InMon Corporation's sFlow: A Method for Monitoring Traffic in Switched and Routed Networks," Network Working Group, Request for Comments 3176, The Internet Society, Sep. 2001.
sFlow & Benefits, "Complete Network Visibility and Control—You Cannot Control What You Cannot See," Power Point Presentation by sFlow.org, 2004.
"Brocade sFlow for Network Traffic Monitoring," Brocade Communications Systems, Inc., 2009, 11/09 GA-WP-1431-00.
Brocade Website Article on IP/Ethernet, IPv6, http://www.brocade.com/solutions-technology/technology/ethernet-technology/ipv6.page.
P. Phall, S. Panchen, N. McKee; Request for Comments: 3176 (rfc3176); InMon Corporation's sFlow: A Method for Monitoring Traffic in Switched and Routed Networks; Sep. 2001; The Internet Society; Network Working Group.

* cited by examiner

*Primary Examiner* — Donald Mills
*Assistant Examiner* — Henry Baron
(74) *Attorney, Agent, or Firm* — Wong, Cabello, Lutsch, Rutherford & Brucculeri, L.L.P.

(57) ABSTRACT

A solution for network packet latency measurement includes, at a network device having a memory, storing a first time value indicating when an ingress port of the network device received a packet. The solution also includes storing a second time value indicating when an egress port of the network device received the packet for transmission towards another network device. The solution also includes storing a difference between the first time value and the second time value.

22 Claims, 6 Drawing Sheets

NETWORK PACKET LATENCY MEASUREMENT

FIELD OF THE INVENTION

Aspects of the present invention relate to network packet latency measurement.

BACKGROUND

With some network devices, communication between an ingress port of the network device and an egress port of the network device may be possible via multiple available routes through the network device. Such communication is embodied in a sequence of transmitted data packets or a "flow" between the ingress port and the egress port, wherein the flow typically represents a single session or data exchange within a specific protocol. The flow enters the network device at the ingress port and leaves the network device at the egress port.

In cases where multiple routes exist for a flow, when the ingress port receives a packet associated with that flow, the network device determines whether a route though the network device has already been assigned to the flow. If a route has already been assigned, the network device transmits the packet through the network device corresponding to the assigned route. If a route has not already been assigned, the network device selects one of the available routes over which to transmit the flow and records the selected route corresponding to the flow.

Typically, such a selection is performed randomly and/or without significant knowledge of downstream network characteristics, and therefore the selected route may not offer the best performance. In other words, in some circumstances, another available route through the network device may have provided better performance but might not be selected. In such cases, after that initial selection, the flow is fixed to the lower performance route for the flow's duration. For example, a flow may be routed through a part of the network device that includes slow processors and/or congested links, while other routes were available that do not include such slow processors or congested links. Yet, by virtue of the initial route selection, the flow remains bound to the slower route until its completion. Such route selection can result in non-optimal routing, particularly for latency-sensitive flows.

Further, network device performance can change as the traffic through various network links within the network device changes. Therefore, even if an optimal route is initially selected for a given flow, the route may later change to have excessive latency while other routes could provide a lower latency. However, no solutions exist to determine network packet latency times for traversal of the packet through the network device. And no solutions exist to dynamically adjust routing based on latency distributions and changes in a network device. Accordingly, a need exists in the art for an improved solution for network packet latency measurement.

SUMMARY OF THE INVENTION

A solution for network packet latency measurement includes, at a network device having a memory, storing a first time value indicating when an ingress port of the network device received a packet. The solution also includes storing a second time value indicating when an egress port of the network device received the packet for transmission towards another network device. The solution also includes storing a difference between the first time value and the second time value.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
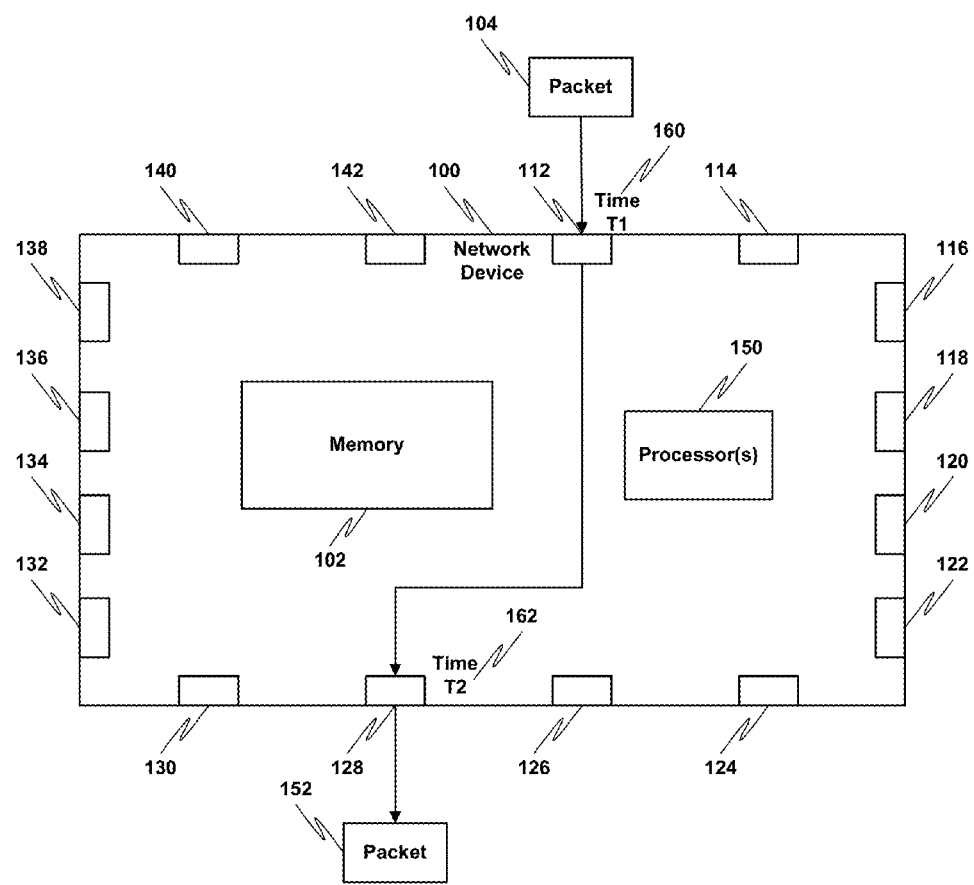
FIG. 1 is a block diagram that illustrates a network device for network packet latency measurement in accordance with one embodiment.

Embodiments of the present invention are described herein in the context of network packet latency measurement. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

According to one embodiment, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment, the components, processes and/or data structures may be implemented using machine language, assembler, C or C++, Java and/or other high level language programs running on a data processing computer, such as a network switch that includes one or more PowerPC microprocessors, personal computer, workstation computer, mainframe computer, or high performance server. Different implementations may be used and may include other types of operating systems, computing platforms, computer programs, firmware, computer languages and/or general-purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "network" includes any manner of data network, including, but not limited to, networks sometimes (but not always and sometimes overlappingly) called or exemplified by local area networks (LANs), wide area networks (WANs), metro area networks (MANs), storage area networks (SANs), residential networks, corporate networks, inter-networks, the Internet, the World Wide Web, cable television systems, telephone systems, wireless telecommunications systems, fiber optic networks, token ring networks, Ethernet networks, Fibre Channel networks, ATM networks, frame relay networks, satellite communications systems, and the like. Such networks are well known in the art and consequently are not further described here.

In the context of the present invention, the term "identifier" describes an ordered series of one or more numbers, characters, symbols, or the like. More generally, an "identifier" describes any entity that can be represented by one or more bits.

In the context of the present invention, the term "processor" describes a physical computer (either stand-alone or distributed) or a virtual machine (either stand-alone or distributed) that processes or transforms data. The processor may be implemented in hardware, software, firmware, or a combination thereof.

In the context of the present invention, the term "data store" describes a hardware and/or software means or apparatus, either local or distributed, for storing digital or analog information or data. The term "Data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, file systems, record systems, object oriented databases, relational databases, SQL databases, audit trails and logs, program memory, cache and buffers, and the like.

In the context of the present invention, the term "network interface" describes the means by which users access a network for the purposes of communicating across it or retrieving information from it.

In the context of the present invention, the term "system" describes any computer information and/or control device, devices or network of devices, of hardware and/or software, comprising processor means, data storage means, program means, and/or interface means, which is adapted to communicate with the embodiments of the present invention, via one or more data networks or connections, and is adapted for use in conjunction with the embodiments of the present invention.

In the context of the present invention, the term "route" refers to a data path from a source switch to a destination switch. Two different routes for the same source-destination pair may share zero or more links.

In the context of the present invention, the term "switch" describes any network equipment with the capability of forwarding data bits from an ingress port to an egress port. Note that "switch" is not used in a limited sense to refer to FC switches. A "switch" can be an FC switch, Ethernet switch, TRILL routing bridge (RBridge), IP router, or any type of data forwarder using open-standard or proprietary protocols.

The terms "frame" or "packet" describe a group of bits that can be transported together across a network. "Frame" should not be interpreted as limiting embodiments of the present invention to Layer 2 networks. "Packet" should not be interpreted as limiting embodiments of the present invention to Layer 3 networks. "Frame" or "packet" can be replaced by other terminologies referring to a group of bits, such as "cell" or "datagram."

It should be noted that the network packet latency measurement system is exemplary of the present invention, but the present invention is not so limited. The exemplary embodiments illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

Example embodiments of the present disclosure provide a solution for measuring packet latency times of a network device. The packet latency times indicate the time required for a packet to traverse a path from an ingress port of the network device to an egress port of the network device. Accumulated metrics regarding packet latency times may used to monitor compliance with service level agreements (SLAs), and for network device optimization.

FIG. 1 is a block diagram that illustrates a network device for network packet latency measurement in accordance with one embodiment. As shown in FIG. 1, network device 100 comprises multiple ports (112-142), a memory 102, and one or more processors 150. The one or more processors 150 are configured to store a first time value 160 indicating when an ingress port 112 of the network device 100 received a packet 104, store a second time value 162 indicating when an egress port 128 of the network device 100 received the packet 104 for transmission towards another network device (not shown in FIG. 1). The one or more processors 150 are further configured to store a difference between the first time value 160 and the second time value 162.

According to one embodiment, the one or more processors 150 are configured to store the first time value 160 in a field prefixed to the packet 104, and to remove the field prior to transmission of the packet 104 towards another network device. According to another embodiment, the one or more processors 150 are configured to store the first time value 160 in a field appended to the packet 104, and to remove the field prior to transmission of the packet 104 towards another network device. These embodiments are described in more detail below with reference to FIG. 4.

According to one embodiment, the one or more processors 150 are configured to store the first time value in a field of the packet 104. This embodiment is described in more detail below with reference to FIG. 5.

According to another embodiment, the one or more processors 150 are configured to store the first time value 160, store the second time value 162, and store the difference between the first time value 160 and the second time value 162 on a predetermined portion of packets 104 received at the ingress port 112. For example, an implementation may determine network packet latency times for one out of every 100 packets matching a particular set of criteria.

According to another embodiment, the one or more processors 150 are further configured to dynamically change the predetermined portion or sampling frequency based at least in part on a service level agreement. For example, an implementation may use a relatively high sampling frequency for packets with SLAs requiring a relatively high level of service, and the implementation may use a relatively low sampling frequency for packets with SLAs requiring a relatively low level of service.

According to another embodiment, the one or more processors 150 are further configured to store one or more metrics regarding transmission of packets 104 through the network device 100. Example metrics are shown below in Table 1.

TABLE 1

Minimum packet latency measured for the egress port
Maximum packet latency measured for the egress port
Accumulated total of measured packet latencies for the egress port
Quantity of packets measured for latency
Quantity of packets traversing the egress port
High packet latency threshold
Quantity of measured packets having a latency value greater than the high packet latency threshold
Whether to store packets having a packet latency greater than the high packet latency threshold
Minimum packet latency measured for the egress port
Maximum packet latency measured for the egress port The minimum packet latency measure for the egress port metric represents the minimum recorded packet latency for packets of a particular flow received at the egress port 128. The maximum packet latency measure for the egress port metric represents the maximum recorded packet latency for packets of a particular flow received at the egress port 128.

The accumulated total of measured packet latencies for the egress port metric represents the accumulated total of measured packet latencies for packets of a particular flow received at the egress port 128.

The quantity of packet latencies measured for the egress port metric represents the total quantity or number of packets measured for a given flow. The quantity of packet traversing the egress port represents the total quantity or number of packets of a particular flow received at the egress port 128.

The high packet latency threshold metric represents network packet latency time value which, if exceeded, indicates network packets of a particular flow are taking too much time to traverse the network device 100. This threshold may be used to trigger an alarm or otherwise alert a network administrator.

The quantity of measured packet latencies having a value greater than the high packet latency threshold metric represents the total quantity or number of packets that were measured for latency whose latency value exceeded the high latency threshold metric.

The metric indicating whether to store packets having a packet latency greater than the high packet latency threshold may be used to trigger storage of packets of a particular flow having a packet latency greater than the high packet latency threshold. The stored packets may be used for subsequent analysis to determine, for example, whether particular components of the network device 100 are over utilized or under utilized.

The minimum packet latency measured for the egress port metric represents the minimum packet latency measured for packets of a particular flow received at the egress port 128. And the maximum packet latency measured for the egress port metric represents the maximum patent latency measured for packets of a particular flow received at the egress port 128.

According to one embodiment, the one or more processors 150 are configured to store an alert message for sending towards another network device if the one or more metrics exceeds a threshold. The alert message may be used, for example, to trigger subsequent analysis to determine whether particular components of the network device 100 are over utilized or under utilized. According to another embodiment, the one or more processors 150 are configured to store the one or more metrics for packets associated with a first priority level, where the first priority level is a measure of the importance of timely transmission of the packets through the network device 100. According to another embodiment, the one or more processors 150 are configured to store the one or more metrics for packets associated with a first Virtual Local Area Network (VLAN). According to another embodiment, the one or more processors 150 are further configured to store the one or more metrics for packets associated with both (1) a first priority level and (2) a first Virtual Local Area Network (VLAN).

According to another embodiment, the one or more processors 150 are further configured to determine compliance with a service level agreement based at least in part on the metrics.

According to another embodiment, the one or more processors 150 are further configured to make one or more adjustments internal to the network device 100 if the one or more metrics exceeds a threshold. For example, the amount of memory allocated to a process or data structure may be adjusted if the one or more metrics exceeds a threshold. As a further example, the amount or type of processors allocated for a particular process may be adjusted if the one or more metrics exceeds a threshold. As a further example, a packet flow data path may be adjusted if the one or more metrics exceeds a threshold.

According to another embodiment, the one or more processors 150 are further configured to read the first time value and the second time value from a reference clock. According to another embodiment, the reference clock comprises a sequential counter incremented at a known period, for example a sequential counter clocked by a reference oscillator.

According to another embodiment, the network device 100 is configured as a network switch. According to another embodiment the network device 100 is configured as a network router. According to another embodiment, the network device 100 is configured as a gateway. According to another embodiment the network device 100 is configured as a network access device. According to another embodiment, the network device 100 is configured as a Web server. According to another embodiment, the network device is configured as a firewall.

Figure 2:
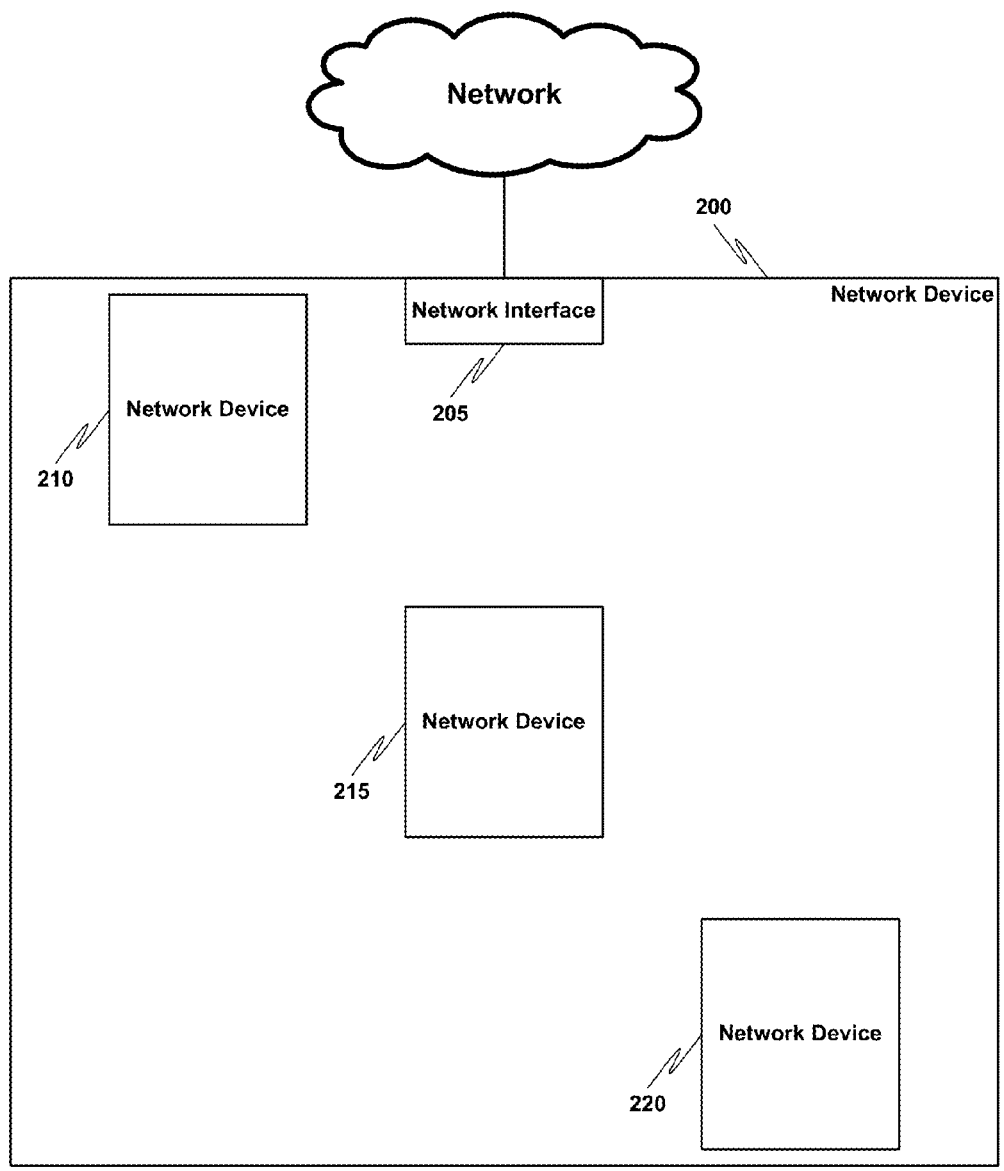
FIG. 2 is a block diagram that illustrates system for network packet latency measurement in accordance with one embodiment.

FIG. 2 is a block diagram that illustrates system for network packet latency measurement in accordance with one embodiment. As shown in FIG. 2, network device 200 comprises a network interface 205 and network devices (210, 215, 220). Network interface 205 of network device 200 is configured to interface between a network and network devices (210, 215, 220).

Network devices (210, 215, 220) may be implemented as described above with respect to network device 100 of FIG. 1. In more detail, network device 210 may be configured to measure packet latency times for packets traversing from an ingress port of network device 210 to an egress port of network device 210; network device 215 may be configured to measure packet latency times for packets traversing from an ingress port of network device 215 to an egress port of network device 215; and network device 220 may be configured to measure packet latency times for packets traversing from an ingress port of network device 220 to an egress port of network device 220.

Additionally, network device 200 may be implemented as described above with reference to network device 100 of FIG. 1. In more detail, network device 200 may be configured to measure packet latency times for packets traversing from an ingress port of network device 200 to an egress port of network device 200, where the packets may traverse through one or more of network device 210, network device 215, and network 220.

Figure 3:
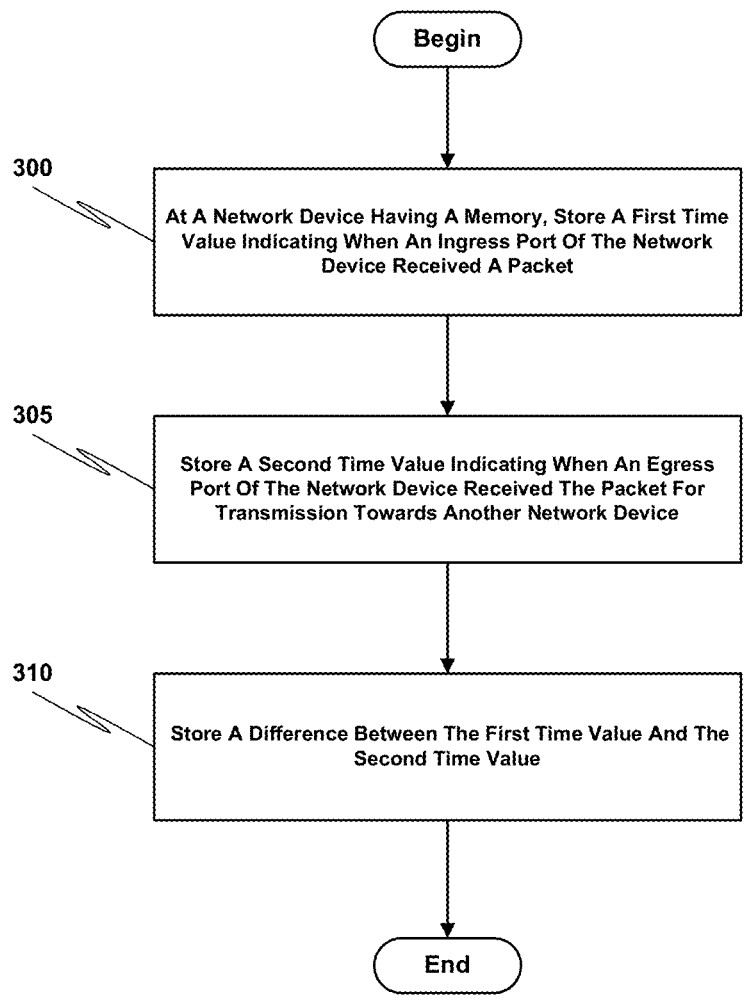
FIG. 3 is a flow diagram that illustrates a method for network packet latency measurement in accordance with one embodiment.

FIG. 3 is a flow diagram that illustrates a method for network packet latency measurement in accordance with one embodiment. The processes illustrated in FIG. 3 may be implemented in hardware, software, firmware, or a combination thereof. For example, the processes illustrated in FIG. 3 may be implemented by network device 100 of FIG. 1, network device 200 of FIG. 2, network device 210 of FIG. 2, network device 215 of FIG. 2, or network device 220 of FIG. 2. At 300, a network device having a memory stores a first time value indicating when an ingress port of the network device received a packet. At 305, the network device stores a second time value indicating when an egress port of the network device received the packet for transmission towards another network device. At 310, the network device stores a difference between the first time value and the second time value.

Figure 4:
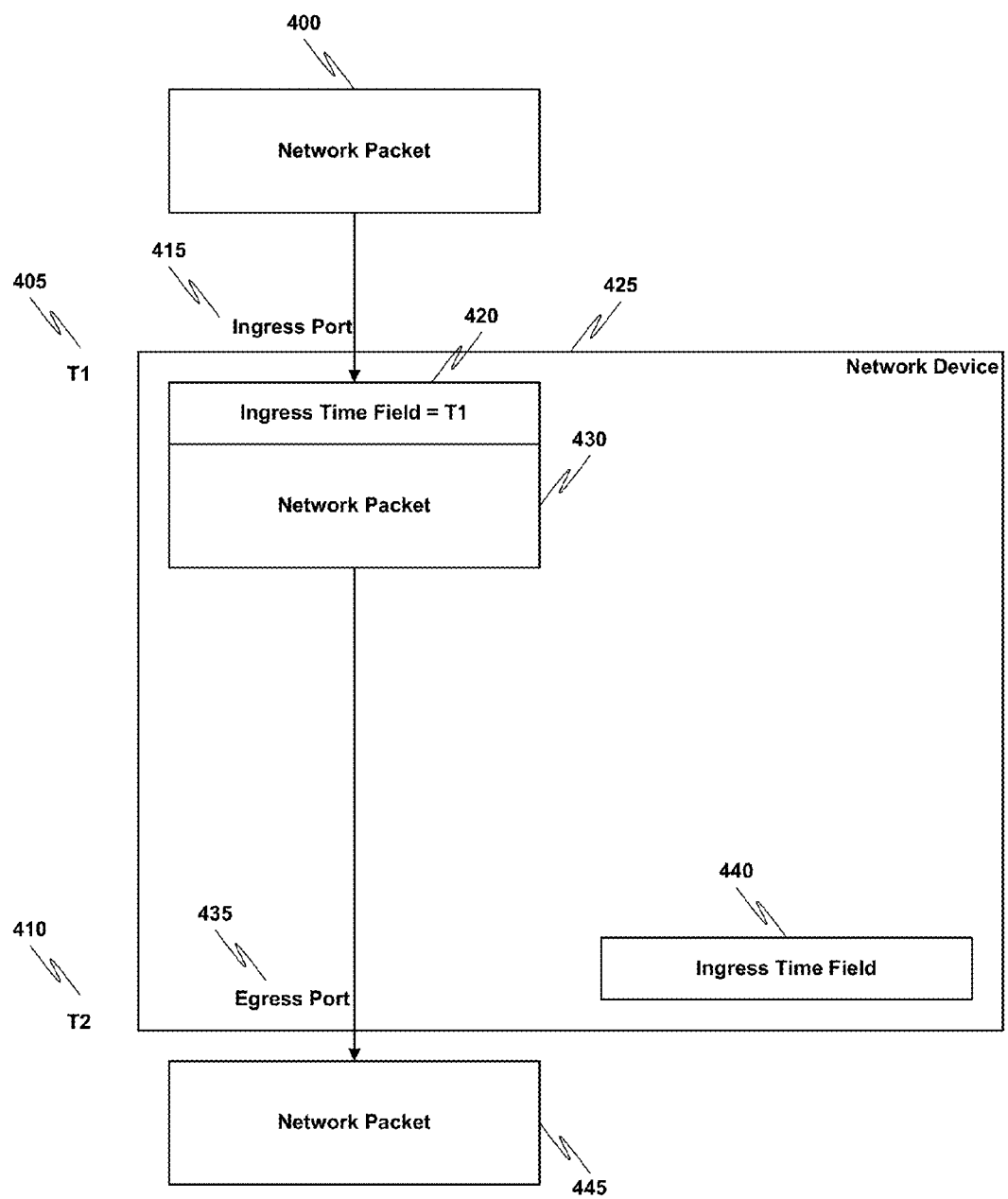
FIG. 4 is a block diagram that illustrates prefixing or appending to a packet an ingress time value indicating when an ingress port of a network device received the packet, in accordance with one embodiment.

FIG. 4 is a block diagram that illustrates prefixing or appending to a packet an ingress time value indicating when an ingress port of a network device received the packet, in accordance with one embodiment. As shown in FIG. 4, a network packet 400 is received at an ingress port 415 of network device 425. Network device 425 either appends (not shown in FIG. 4) or prefixes to the network packet 430, a field 420 indicating an ingress time value 405 that indicates when the network packet 400 was received at the ingress port 415. At the egress port 435, the field 420 is removed from the packet 430 prior to transmission of the packet 430 towards another network device. At the egress port 435, network device 425 uses the value 405 in field 440 to determine a difference between the ingress time value 405 and a time value 410 indicating when the egress port 435 received the packet 430 for transmission towards another network device.

Figure 5:
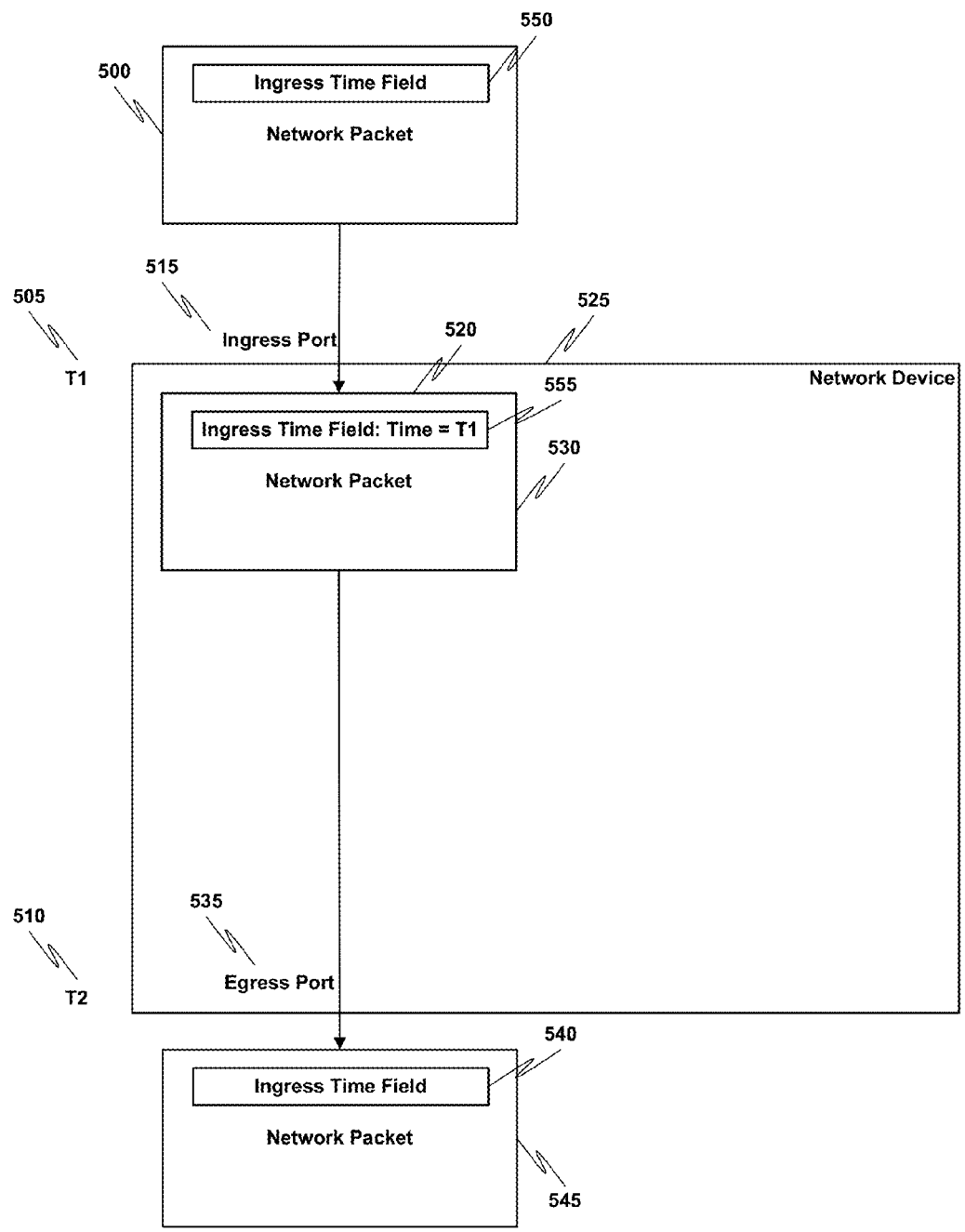
FIG. 5 is a block diagram that illustrates including in a field of a packet, an ingress time value indicating when an ingress port of a network device received the packet, in accordance with one embodiment.

FIG. 5 is a block diagram that illustrates including in a field of a packet, an ingress time value indicating when an ingress port of a network device received the packet, in accordance with one embodiment. As shown in FIG. 5, a network packet 500 having an ingress time field 550 is received at an ingress port 515 of network device 525. Network device 525 stores in ingress time field 555, a value 505 that indicates when the network packet 550 was received at the ingress port 515. At the egress port 535, network device 525 uses the value 505 in field 555 to determine a difference between the ingress time value 505 and a time value 510 indicating when the egress port 535 received the packet 530 for transmission towards another network device.

A network device 100 may also include one or more processor-readable storage media encoding computer-executable instructions for executing one or more processes of network packet latency measurement on the network device 100. It should also be understood that various types of network devices (e.g., Fibre Channel switches, Ethernet switches, Transparent Interconnection of Lots of Links (TRILL) RBridges, Multiprotocol Label Switching (MPLS) label switches, etc.) may employ a different architecture than explicitly described in the implementations disclosed herein.

Figure 6:
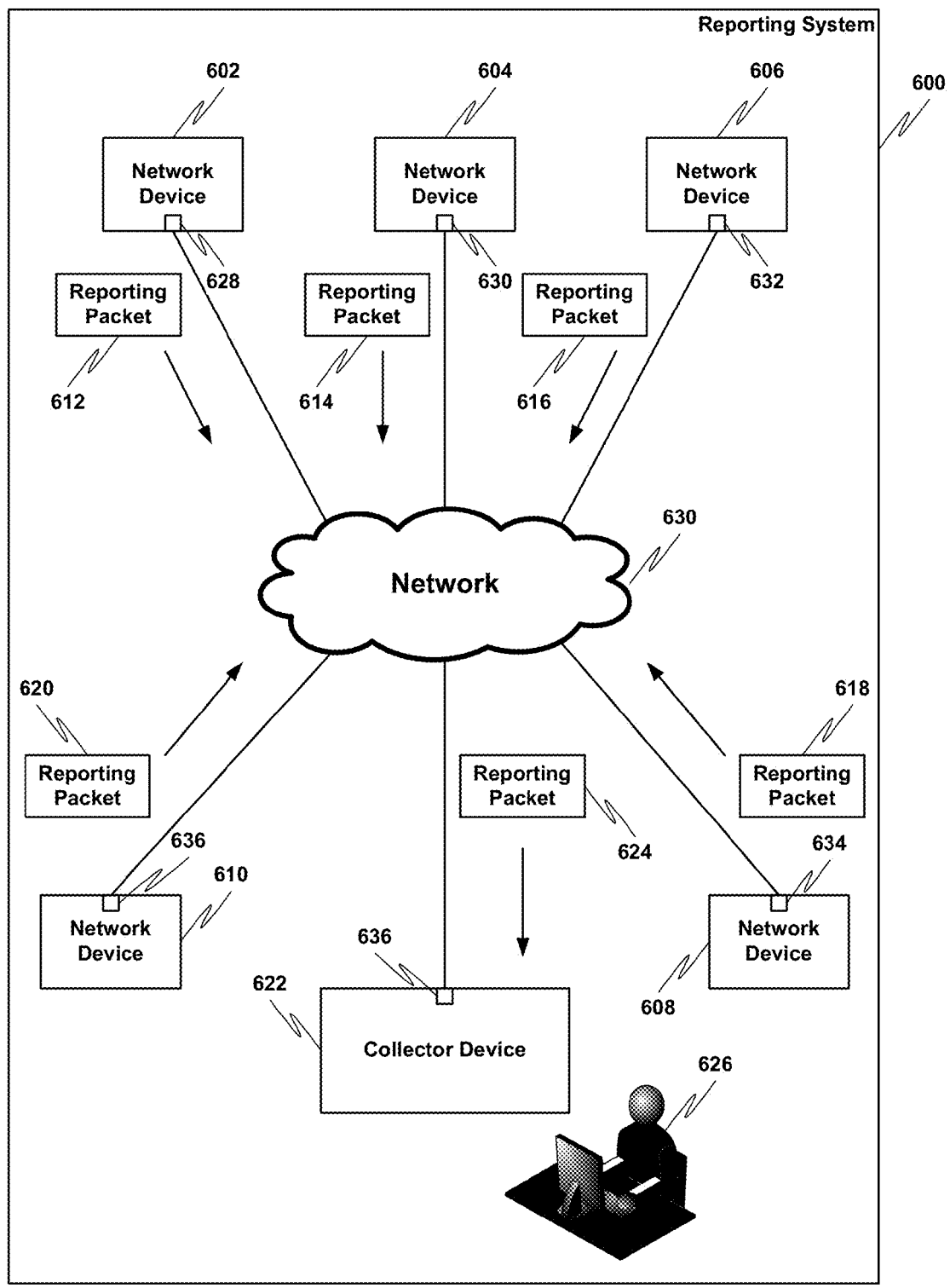
FIG. 6 is a block diagram that illustrates a system for reporting data collected for metrics regarding transmission of packets through a network device in accordance with one embodiment.

As mentioned above, Table 1 provides a listing of example metrics regarding transmission of packets 104 through the network device 100. FIG. 6 is a block diagram that illustrates a system 600 for reporting data collected for such metrics in accordance with one embodiment. System 600 includes a collector device 622 which is coupled through external network 630 to a plurality of network devices 602-610. Network devices 602-610 may be implemented as described above with respect to network device 100 of FIG. 1. One or more or all of the collected data of these metrics of Table 1 may be inserted by one or more processors of each network device 602-610 in a field of a payload portion of a reporting packet 612-620 created by the respective network device 602-610. The fields of the payload portion of the reporting packet 612-620 additionally maybe be populated with other information related to other aspects of network device 602-610, such as local condition data, e.g., queue loads or application loads, etc., or identifying information related to network device 602-610, and so forth. A header portion of the reporting packet 612-620 is created by network device 602-610 and includes network address information sufficient for the reporting packet 612-620 to be packet switched over network 630 to collector device 612. Network device 602-610 transmits the reporting packet 612-620 out port 628-636 to network 630. Collector device 622 receives the reporting packet 624 via port 636 coupled to network 630 and processes the associated data received in the payload of the reporting packet 624. Collector device 622 may be a programmed general purpose computer, with associated network management programming for processing the data received via the reporting packets 612-620 from each of the plurality of network devices 602-610, and then presents the resulting information in a form useful to a network administrator 626, such as through graphics or tables on a display, printed reports, etc. Collector device 622 may be programmed to compare and display the collected and processed information to threshold values for the particular metric, and may be programmed to generate alarms if a threshold is exceeded.

Embodiments of the present invention are not limited to networks using a particular protocol. For example, embodiments of the present invention can be applied to SANs, or networks defined in a particular Open System Interconnection Reference Model (OSI reference model). Embodiments of the present invention can also be applied in an Internet Protocol (IP) network, a Fibre Channel (FC) network, an Ethernet network, a MPLS network, or a TRILL network. Other open-standard or proprietary networks can also use embodiments of the present invention. More generally, embodiments of the invention may be applied to any network where a packet is switched from an ingress port of a network device to an egress port of the network device.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method comprising:
   at a network device having a memory, storing a first time value indicating when an ingress port of the network device received a packet;
   storing a second time value indicating when an egress port of the network device received the packet for transmission towards another network device;
   storing a difference between the first time value and the second time value; and
   storing one or more metrics, the one or more metrics comprising one or more of:
   a value indicating a minimum packet latency measured for the egress port;
   a value indicating a maximum packet latency measured for the egress port;
   a value indicating an accumulated total of measured packet latencies for the egress port;
   a value indicating a quantity of packets measured for latency;
   a value indicating a high packet latency threshold;
   a value indicating a quantity of packets measured for latency whose measured latency value is greater than the high packet latency threshold; and
   a value indicating whether to store packets having measured packet latencies greater than the high packet latency threshold,
   wherein the method is performed on the packets received at the ingress port at a predetermined sampling frequency, and
   wherein the predetermined sampling frequency is changed based at least in part proportionally to a service level agreement (SLA).

2. The method of claim 1 wherein the first time value is stored in a field of the packet.

3. The method of claim 1 wherein
   the first time value is:
   stored in a field appended to the packet; or
   stored in a field prefixed to the packet; and
   the method further comprises removing the field prior to transmission of the packet towards another network device.

4. The method of claim 1, further comprising storing an alert message for sending towards another network device if the one or more metrics exceeds a threshold.

5. The method of claim 1, further comprising storing the one or more metrics for packets associated with one or more of:
   a first priority level; and
   a first Virtual Local Area Network (VLAN).

6. The method of claim 1, further comprising determining compliance with a service level agreement (SLA) based at least in part on the metrics.

7. The method of claim 1 wherein the first time value and the second time value are read from a reference clock.

8. The method of claim 7 wherein the reference clock comprises a sequential counter incremented at a known period.

9. The method of claim 1 wherein the network device comprises one of a plurality of network devices within another network device having a network interface.

10. The method of claim 1 wherein the network device is configured as a network switch.

11. A network device comprising:
    a memory; and
    one or more processors configured to:
    store a first time value indicating when an ingress port of the network device received a packet;
    store a second time value indicating when an egress port of the network device received the packet for transmission towards another network device;
    store a difference between the first time value and the second time value; and
    store one or more metrics, the one or more metrics comprising one or more of:
    a value indicating a minimum packet latency measured for the egress port;
    a value indicating a maximum packet latency measured for the egress port;
    a value indicating an accumulated total of measured packet latencies for the egress port;
    a value indicating a quantity of packets measured for latency;
    a value indicating a high packet latency threshold;
    a value indicating a quantity of packets measured for latency whose measured latency value is greater than the high packet latency threshold; and
    a value indicating whether to store packets having measured packet latencies greater than the high packet latency threshold,
    wherein the storing of the first time value, the second time value, and the difference is performed on the packets received at the ingress port at a predetermined sampling frequency, and
    wherein the predetermined sampling frequency is based at least in part proportionally to a service level agreement (SLA).

12. The network device of claim 11 wherein the one or more processors are further configured to store the first time value in a field of the packet.

13. The network device of claim 11 wherein the one or more processors are further configured to:
    store the first time value:
    in a field appended to the packet; or
    in a field prefixed to the packet; and
    remove the field prior to transmission of the packet towards another network device.

14. The network device of claim 11 wherein the one or more processors are further configured to store an alert message for sending towards another network device if the one or more metrics exceeds a threshold.

15. The network device of claim 11 wherein the one or more processors are further configured to store the one or more metrics for packets associated with one or more of:
    a first priority level; and
    a first Virtual Local Area Network (VLAN).

16. The network device of claim 11 wherein the one or more processors are further configured to determine compliance with a service level agreement (SLA) based at least in part on the metrics.

17. The network device of claim 11 wherein the one or more processors are further configured to read the first time value and the second time value from a reference clock.

18. The network device of claim 17 wherein the reference clock comprises a sequential counter incremented at a known period.

19. The network device of claim 11 wherein the network device comprises one of a plurality of network devices within another network device having a network interface.

20. The network device of claim 11 wherein the network device is configured as a network switch.

21. A nontransitory program storage device readable by a machine, embodying a program of instructions executable by the machine to perform a method, the method comprising:

at a network device having a memory, storing a first time value indicating when an ingress port of the network device received a packet;

storing a second time value indicating when an egress port of the network device received the packet for transmission towards another network device;

storing a difference between the first time value and the second time value; and storing one or more metrics, the one or more metrics comprising one or more of:

a value indicating a minimum packet latency measured for the egress port;

a value indicating a maximum packet latency measured for the egress port;

a value indicating an accumulated total of measured packet latencies for the egress port;

a value indicating a quantity of packets measured for latency;

a value indicating a high packet latency threshold;

a value indicating a quantity of packets measured for latency whose measured latency value is greater than the high packet latency threshold; and a value indicating whether to store packets having measured packet latencies greater than the high packet latency threshold, wherein the method is performed on the packets received at the ingress port at a predetermined sampling frequency, wherein the predetermined sampling frequency is changed based at least in part proportionally to a service level agreement (SLA).

22. A network device comprising:

a memory;

means for, at the network device, storing a first time value indicating when an ingress port of the network device received a packet;

means for storing a second time value indicating when an egress port of the network device received the packet for transmission towards another network device;

means for storing a difference between the first time value and the second time value; and means for storing one or more metrics, the one or more metrics comprising one or more of:

a value indicating a minimum packet latency measured for the egress port;

a value indicating a maximum packet latency measured for the egress port;

a value indicating an accumulated total of measured packet latencies for the egress port;

a value indicating a quantity of packets measured for latency;

a value indicating a high packet latency threshold;

a value indicating a quantity of packets measured for latency whose measured latency value is greater than the high packet latency threshold; and a value indicating whether to store packets having measured packet latencies greater than the high packet latency threshold, wherein the storing of the first time value, the second time value, and the difference is performed on the packets received at the ingress port at a predetermined sampling frequency, wherein the predetermined sampling frequency is changed based at least in part proportionally to a service level agreement (SLA).

* * * * *